(No Model.)
W. W. & E. F. PRESTON.
FASTENING FOR ICE CREEPERS.
No. 410,331. Patented Sept. 3, 1889.
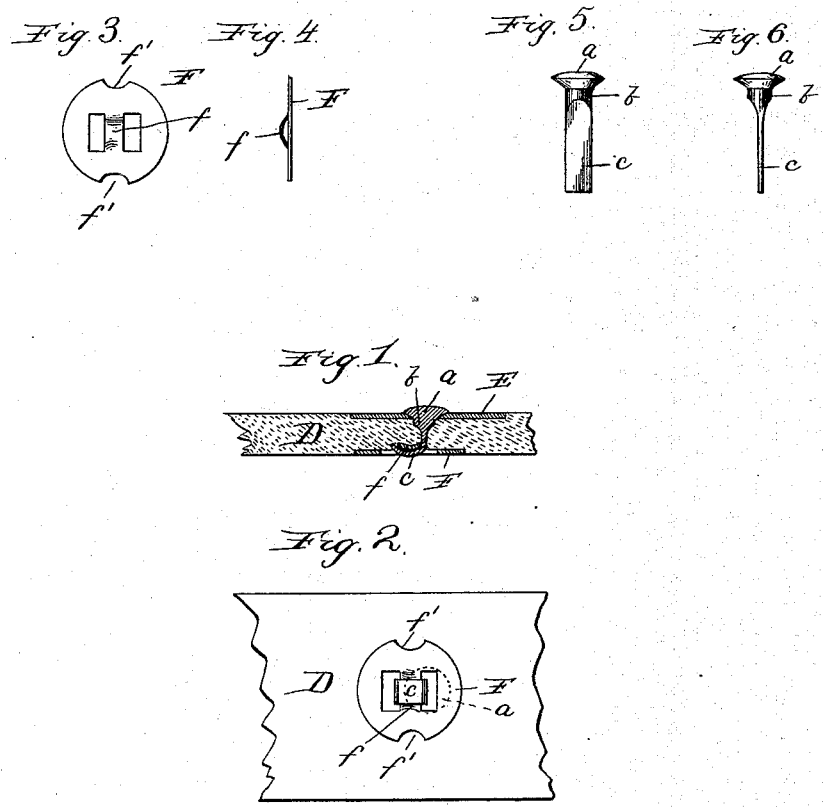
Witnesses
J. Regensteiner
Lew. E. Curtis
Inventor
William W. Preston
Edward F. Preston
By their Attorneys
Munday, Evarts & Adcock

UNITED STATES PATENT OFFICE.

WILLIAM W. PRESTON AND EDWARD F. PRESTON, OF BISMARCK, MICHIGAN, ASSIGNORS TO THE PRESTON ICE CREEPER COMPANY, OF CHICAGO, ILLINOIS.

FASTENING FOR ICE-CREEPERS.

SPECIFICATION forming part of Letters Patent No. 410,331, dated September 3, 1889.

Application filed December 3, 1888. Serial No. 292,580. (No model.)

*To all whom it may concern:*

Be it known that we, WILLIAM W. PRESTON and EDWARD F. PRESTON, citizens of the United States, residing in Bismarck, in the county of Eaton and State of Michigan, have invented a new and useful Improvement in Fastenings for Securing Creepers, &c., to Rubber Shoes, of which the following is a specification.

The object of our invention is to provide means for readily securing heel-plates, wearing-plates, ice-creepers, &c., to the heels and soles of india-rubber shoes. The means employed by us for this purpose and constituting our invention consist of a metallic nail made with a head and having its body blade-shaped or flat, so that it may be readily driven through the rubber and bent or clinched, in conjunction with an interior washer having a bar over which the flat blade of the nail may be clinched or bent with sufficient force to produce considerable compression in the body of the rubber between the head of the nail and the washer, whereby all leakage around and looseness of the nail in its place is prevented.

In the accompanying drawings, which form a part of this specification, and in which similar letters of reference indicate like parts, Figure 1 is a sectional view of our improved fastening, taken through nail, heel-plate, rubber heel, and interior washer. Fig. 2 is a bottom view of what is shown at Fig. 1, showing the interior face of the barred washer. Fig. 3 is a view, similar to the last, of the washer itself detached. Fig. 4 is an edge view of the washer. Figs. 5 and 6 are respectively a front and an edge view of the blade-like nail. All the figures are upon a somewhat enlarged scale.

In said drawings the blade-like nail is shown as composed of a head rounded on top and with a conical under side much like the head of a common wood-screw, except that the nick for the screw-driver is omitted. This head is distinguished by the letter $a$. Instead of having this particular form, which is the form we prefer, it may obviously be of any suitable shape so that it forms a suitable enlargement or shoulder to prevent the nail from drawing through. Below the head is the large neck $b$, long enough, preferably, to pass entirely through the heel-plate and enter the body of the rubber, so as to form a countersink in the rubber. Below this neck the nail is prolonged in a flat blade $c$—a form that may readily be driven through rubber and also easily bent. The nail of course should be made of some malleable metal, so that it is capable of bending for the clinching operation.

At Figs. 1 and 2, D is the rubber heel or sole; E, the heel-plate, ice-creeper, or other metallic plate or object which is to be fastened in place; and F, the internal washer, having the central bar $f$, over which the blade of the nail is to be clinched. For the purpose of positioning this washer in the clinching-die of a nailing-machine we prefer to provide the two peripheral notches $f'$ $f'$, which may set over pins in the die; and in order that the bent portion of the nail in hooking over the bar $f$ may not project beyond the face of the washer we prefer to bend or arch the bar $f$ slightly, as indicated in the drawings. The portion of the washer surrounding the nail-openings is flat, so it may bear upon and compress the rubber around the nail.

Our improved fastener may be applied by hand with a simple riveting-hammer and die; but it is designed to be made more readily with a machine of our invention, which is described at length in an application for a patent filed simultaneously herewith, and which machine consists, generally stated, in a driving-punch, which holds and drives the nail, and a countering-die with a curved face for turning the blade of the nail to clinch the same around the bar $f$ of the washer. The washer in the use of this machine is laid upon the countering-die in proper position, determined by two guide-pins entering the notches $f'$ $f'$. The nail being driven through the rubber and clinched over the bar by whatever means, a compression is produced in the rubber about the blade, and especially at the countersunk neck of the nail, which makes the joint water-tight and the fastening one which is at no time liable to work loose.

We claim—

A fastening for attaching ice-creepers and analogous articles, consisting of a malleable nail having a large neck $b$, long enough to pass through the creeper and enter the body of the rubber, and a flat blade $c$, in combination with the washer F, having a central bar $f$, around which the nail may be clinched, said washer bearing upon the rubber immediately around the nail, substantially as set forth.

WILLIAM W. PRESTON.
EDWARD F. PRESTON.

Witnesses:
 H. M. MUNDAY,
 JOHN W. MUNDAY.